US012739047B2

(12) United States Patent
Lukens et al.

(10) Patent No.: US 12,739,047 B2
(45) Date of Patent: Sep. 15, 2026

(54) BROADBAND POLARIZATION-ENTANGLED SYSTEM FOR C+L-BAND FLEX-GRID QUANTUM NETWORKS

(71) Applicant: UT-Battelle, LLC, Oak Ridge, TN (US)

(72) Inventors: Joseph M. Lukens, Knoxville, TN (US); Muneer Alshowkan, Oak Ridge, TN (US); Nicholas A. Peters, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 158 days.

(21) Appl. No.: 18/750,052

(22) Filed: Jun. 21, 2024

(65) Prior Publication Data

US 2025/0167910 A1 May 22, 2025

Related U.S. Application Data

(60) Provisional application No. 63/522,903, filed on Jun. 23, 2023.

(51) Int. Cl.
*H04J 14/02* (2006.01)
*G02F 1/355* (2006.01)
*H04B 10/70* (2013.01)

(52) U.S. Cl.
CPC ........ *H04J 14/0212* (2013.01); *G02F 1/3558* (2013.01); *H04B 10/70* (2013.01); *H04J 14/0267* (2013.01)

(58) Field of Classification Search
None
See application file for complete search history.

(56) References Cited

U.S. PATENT DOCUMENTS

2009/0074192 A1* 3/2009 Beal ...................... H04L 9/0858 380/278
2009/0180616 A1* 7/2009 Brodsky ............ H04J 14/0283 380/278
2020/0274703 A1* 8/2020 Lukens ................ H04L 9/0858
(Continued)

OTHER PUBLICATIONS

Peters, N. et al., “Dense wavelength multiplexing of 1550nm QKD with strong classical channels in reconfigurable networking environments”, New Journal of Physics, Apr. 2009, pp. 1-17, vol. 11.
(Continued)

*Primary Examiner* — Darren E Wolf
(74) *Attorney, Agent, or Firm* — Scully, Scott, Murphy & Presser, P.C.

(57) ABSTRACT

An on-demand distribution of pairs of polarization-entangled frequency-correlated photons is provided. The pairs are frequency-correlated in different bands of a multiband spectrum which may include the C-Band and the L-Band. The pairs are provided to wavelength selective-switches (WSS), which may be simultaneously controlled to provide the pairs to different receivers that are respectively connected to the output ports of the WSSes. Each WSS has a plurality of frequency channels of δf-width bins aligned to the ITU grid. A network controller receives a request for the distribution of one or more pairs to a pair of receivers and controls frequency-correlated channels in the WSSes to provide the pair(s) to the receivers.

26 Claims, 7 Drawing Sheets

(56) References Cited

U.S. PATENT DOCUMENTS

2021/0175976 A1* 6/2021 Rahman ................ H04L 9/0855
2023/0204863 A1* 6/2023 Aoki .................... G02B 6/2713
385/30

OTHER PUBLICATIONS

Ma, Y. et al., "Recent Progress of Wavelength Selective Switch", Journal of Lightwave Technology, 2021, pp. 896-903, vol. 39, No. 4.
Vergyris, P. et al., "Fully guided-wave photon pair source for quantum applications", Quantum Science and Technology, 2017, pp. 1-9, vol. 2, No. 2.
Lingaraju, N. et al., "Adaptive bandwidth management for entanglement distribution in quantum networks," Optica, 2021, pp. 329-332, vol. 8, No. 3.
Alshowkan, M. et al., "Reconfigurable Quantum Local Area Network Over Deployed Fiber", PRX Quantum, Oct. 2021, pp. 040304-1 to 040304-13, vol. 2, No. 4.
Alshowkan, M. et al., "Advanced architectures for high-performance quantum networking," J. Opt. Commun. and Networking, Jun. 2022, pp. 493-499, vol. 14, No. 6.
Alnas, J. et al., "Optimal resource allocation for flexible-grid entanglement distribution networks", Jul. 2022, pp. 1-19, vol. 30, No. 14.
Blume-Kohout, R., "Optimal, reliable estimation of quantum states", New Journal of Physics, 2010, pp. 1-25, vol. 12, No. 4.
Lukens, J. et al., "A practical and efficient approach for Bayesian quantum state estimation", New Journal of Physics, Jul. 2020, pp. 1-12, vol. 22, No. 6.
Lu, H. et al., "Bayesian tomography of high-dimensional on-chip biphoton frequency combs with randomized measurements", Nat Commun., 2022, pp. 1-12, vol. 13, No. 4338.
Grondalski, J. et al., "The fully entangled fraction as an inclusive measure of entanglement applications", Physics Letters A, 2002, pp. 573-580, vol. 300, No. 6.
Bennett, C. et al., "Mixed-state entanglement and quantum error correction", Phys. Rev. A, Nov. 1996, pp. 3824-3851, vol. 54, No. 5.
Vidal, G. et al., "Computable measure of entanglement", Phys. Rev. A, Feb. 2002, pp. 032314-1 to 032314-11, vol. 65, No. 3.
Plenio, M. B., "Logarithmic Negativity: A Full Entanglement Monotone That is not Convex", Phys. Rev. Lett., 2005, pp. 090503-1 to 090503-4, vol. 95, No. 9.
Devetak, I. et al., "Distillation of secret key and entanglement from quantum states", Proceedings of the Royal Society A: Mathematical, Physical and Engineering Sciences, 2005, pp. 207-235, vol. 461.
Arahira, S. et al., "Generation of polarization entangled photon pairs at telecommunication wavelength using cascaded $\chi 2$ processes in a periodically poled LiNbO3 ridge waveguide", Opt Express, Aug. 2011, pp. 16032-16043, vol. 19, No. 17.
Lu, H. et al., "Quantum interference and correlation control of frequency-bin qubits," Optica, 2018, pp. 1455-1460, vol. 5, No. 11.
Barreiro, J. et al., "Generation of Hyperentangled Photon Pairs", Phys. Rev. Lett., Dec. 2005, pp. 260501-1 to 260501-4, vol. 95, No. 26.
Barreiro, J. et al., "Beating the channel capacity limit for linear photonic superdense coding", Nature Phys, Apr. 2008, pp. 282-286, vol. 4.
Shtaif, M. et al., "Nonlocal compensation of polarization mode dispersion in the transmission of polarization entangled photons", Opt. Express, Jan. 2011, pp. 1728-1733, vol. 19, No. 3.
Jones, D. et al., "Tuning quantum channels to maximize polarization entanglement for telecom photon pairs", npj Quantum Inf, 2018, pp. 1-7.
Kirby, B. et al., "Effect of Polarization Dependent Loss on the Quality of Transmitted Polarization Entanglement", Journal of Lightwave Technology, Jan. 2019, pp. 95-102, vol. 37, No. 1.

* cited by examiner

1
Receiver 1
20A
Receiver 2
20B
Receiver 3
20C
Receiver 4
20D
....
Receiver "N"
20N
Network Controller
100
Transmitter
10

BROADBAND POLARIZATION-ENTANGLED SYSTEM FOR C+L-BAND FLEX-GRID QUANTUM NETWORKS

CROSS-REFERENCE TO RELATED APPLICATIONS

This application claims the benefit of U.S. Provisional Application No. 63/522,903 filed on Jun. 23, 2023, which is incorporated by reference herein in its entirety.

STATEMENT REGARDING FEDERALLY SPONSORED RESEARCH OR DEVELOPMENT

This invention was made with Government support under DE-AC05-00OR22725 awarded by U.S. Department of Energy. The Government has certain rights to this invention.

FIELD OF THE DISCLOSURE

This disclosure relates to quantum communication and more specifically to quantum communication using an ultra-broadband photon(s) source integrating multiple bands.

BACKGROUND

Optical communications are a vital technology in the fast-growing world of data traffic, as they permit several carriers in a single optical fiber, such as via wavelength division multiplexing (WDM). The rapid increase in data traffic has caused a significant demand for more dense transmission capacity, such as by using dense wavelength division multiplexing (DWDM). However, network deployment remains an ongoing challenge due to continuous bandwidth increases. Currently, most known commercially available technologies are functional in the optical C-Band (e.g., 1530 nm-1565 nm). While reducing channel spacing is one method of increasing capacity (e.g., increasing the number of channels and decreasing each channel width), it can exacerbate nonlinear effects such as cross-phase modulation and four-wave mixing.

Using other optical bands is an attractive alternative for increasing the number of channels within a fiber as opposed to decreasing the channel width. For example, it has been proposed to use the L-Band (e.g., 1565 nm-1625 nm). One of the benefits of using the L-Band is low loss, comparable to the C-Band. This has led to a developing of optical components for the L-Band including filters, switches and pulse shapers (among other components), which in turn has made using the L-Band viable for optical communication, This optical communication may include quantum communication. Squeezed light, such as in the form of entangled photon pairs for discrete-variable (DV) and bright states for continuous-variable (CV) encoding, is an importance resource for quantum communication. In order to achieve a commercially viable quantum network which may include a quantum Internet, a way to distribute entangled pairs of photons between distant quantum resources is essential. There are different types of entanglement. For example, there is polarization entanglement.

SUMMARY

Accordingly disclosed is a system for distributing entangled photon pairs. The system comprises a source of entangled photon pairs, a wavelength division multiplexer (WDM), wavelength-selective switches (WSSes), and a network controller. The source comprises a pump laser and a nonlinear medium that are configured and operated to produce, when the pump laser pumps the nonlinear medium, pairs of polarization-entangled frequency-correlated photons having frequencies $f_C$ and $f_L$ centered on a boundary between a C-band and a L-band. for any pair of entangled photons, the frequency $f_C$ of one is within a C-band frequency range and the frequency $f_L$ of the other one is within a L-band frequency range. The frequency of each is equidistant from the boundary. The WDM is optically coupled with the source. The WDM has a first port and a second port. The WDM is configured to direct photons of the entangled pairs having frequencies in the C-band frequency range to the first port, and photons of the entangled pairs having corresponding frequencies in the L-band frequency range to the second port. A C-band wavelength-selective switch (WSS) is optically coupled with the WDM at the first port. The C-band WSS has $M_C$ distribution ports. An L-band WSS is optically coupled with the WDM at the second port. The L-band WSS has $M_L$ distribution ports. The photons entering the C-band WSS are grouped by frequency into N channels of δf-width bins aligned to the International Telecommunication Union (ITU) grid for control. The photons entering the L-band WSS are grouped by frequency into N channels of δf-width bins aligned to the ITU grid for control, where $N \geq M_C$ and $N \geq M_L$. The C-band WSS's $j^{th}$ channel associated with a channel frequency $f_{Cj}$ is controllable concurrently with the L-band WSS's $j^{th}$ channel associated with a channel frequency $f_{Lj}$, for channel frequencies that are equidistant from the boundary, where j=1, . . . , N. The network controller has one or more communication interfaces. The network controller is communicatively coupled with the C-band WSS and the L-band WSS and receivers. The network controller is configured to receive a request to provide to first and second optical receivers respective photons of entangled-photon pairs. The first optical receiver is coupled through an optical communications network to the C-band WSS's $$i_C^{th}$$

distribution port and the second optical receiver is coupled through the optical-communications network to the L-band WSS's $$i_L^{th}$$

distribution port, where $i_C=1, \ldots, M_C$ and $i_L=1, \ldots, M_L$. The network controller is configured to determine if there is available bandwidth to satisfy the request, and cause the C-band WSS to connect the C-band WSS's $j^{th}$ channel to the C-band WSS's $$i_C^{th}$$

distribution port and the L-Band WSS to connect the L-band WSS's $j^{th}$ channel to the L-band WSS's $$i_L^{th}$$

distribution port when there is available bandwidth to cause a distribution of photons of entangled-photon pairs to the first and second optical receivers.

In an aspect of the disclosure, the pump laser may have a frequency of 383 THz. However, in other aspects, the pump laser may have a frequency of 191.5 THz. When the pump laser has a frequency of 191.5 THz, the system further comprises a notch filter upstream of the WDM configured to remove light at the frequency of the pump laser. In this aspect, the nonlinear medium is configured for second-harmonic generation.

In an aspect of the disclosure, the nonlinear medium may be a periodically poled lithium niobate (PPLN) waveguide. In an aspect of the disclosure, the nonlinear medium may have a length of about 12 mm.

In an aspect of the disclosure, the system may further comprise temperature controller configured to control a temperature of the PPLN waveguide to produce frequency-correlated photons centered at the boundary and spanning at least a preset bandwidth.

In an aspect of the disclosure, the network controller may be configured to set the width of each channel bin. In an aspect of the disclosure, the width of each channel bin may be selectable from a group consisting of δf=12.5, 25, 50, 100, or 200 GHz.

In an aspect of the disclosure, the request may be for any entangled-photon pairs or for a specific entangled-photon pair requested by corresponding frequencies. When the respect is for a specific entangled phone pair, the network controller is further configured to determine whether channels associated with the specific entangled photon pair requested by corresponding frequencies are available and in response to the channels being available causing the channels to be respectively connected to the C-band WSS's $$i_C^{th}$$

distribution port and the L-band WSS's $$i_L^{th}$$

distribution port.

In an aspect of the disclosure, the network controller may be configured to receive additional requests for providing respective photons of entangled-photon pairs to up to a total of min ($M_C$, $M_L$) pairs of optical receivers, and cause each of the C-band WSS and the L-band WSS to connect up to the total of min ($M_C$, $M_L$) of its channels, respectively, indexed $\{j_1, j_2, \ldots j_{min(M_C M_L)}\}$ to respective min($M_C$, $M_L$) of its distribution ports, to cause distribution of respective photons of entangled-photon pairs to up to the total of min($M_C$, $M_L$) pairs of optical receivers.

In an aspect of the disclosure, the network controller may be configured to receive a request to increase bandwidth for providing respective photons of entangled photon pairs to the first and second optical receivers, determine whether additional bandwidth is available to satisfy the increase; and cause the C-band WSS's $k^{th}$ channel to be connected to the same C-band WSS's $$i_C^{th}$$

distribution port and the L-band WSS's $k^{th}$ channel to be connected the same L-band WSS's $$i_L^{th}$$

distribution port, where k≠j, when it is determined that additional bandwidth is available to satisfy the request to increase bandwidth, to cause increased distribution of respective photons of entangled-photon pairs to the first and second optical receiver.

In an aspect of the disclosure, each of the C-band WSS and the L-band WSS comprises a controller and a spatial light modulator. The network controller may communicate with the controller to cause a channel to be connected to a specific distribution port. In response to a control signal from the network controller, the controller controls the spatial light modulator. In an aspect of the disclosure, the spatial light modulator may be a liquid crystal on silicon type.

In an aspect of the disclosure, the network controller may transmit a notification to the first receiver and the second receiver indicates that the C-band WSS's $j^{th}$ channel and the L-band WSS's $j^{th}$ channel have been connected. In an aspect of the disclosure, the network controller may transmit a notification to the first receiver and the second receiver indicating that the request is denied in response to a determination that bandwidth is not available to satisfy the request.

Also disclosed is a network comprising a first optical receiver. a second optical receiver collocated with the first optical receiver at a single user facility; and the system for distributing entangled-photon pairs having one or more of the above aspects. The first and second optical receivers may be configured to receive, at the single user facility, respective photons of entangled-photon pairs in response to the request.

Also disclosed is a network comprising a first optical receiver located at a first user facility, a second optical receiver located at a second user facility disposed remotely from the first user facility, and the system for distributing entangled-photon pairs having one or more of the above aspects. The first and second optical receivers may be configured to receive respective photons of entangled-photon pairs in response to the request.

In an aspect of the disclosure, the first user facility and the second user facility may be configured to communicate with each other using a secret key generated by quantum key distribution (QKD) from the received entangled-photon pairs.

In other aspects of the disclosure, the first user facility and/or the second user facility may be configured to perform teleportation using the received entangled-photon pairs.

In other aspects of the disclosure, disclosed is a system for distributing entangled-photon pairs for multi-band spectrum. The system comprises a source of entangled-photon pairs, beam splitting subsystem, wavelength-selective switches (WSSes) and a network controller. The source comprises a pump laser and a nonlinear medium that are configured and operated to produce, when the pump laser pumps the nonlinear medium, pairs of polarization-entangled frequency-correlated photons having frequencies $f_i$ and $f_{ii}$ centered on a boundary between two bands of the multi-band spectrum. For any pair of entangled photons, the frequency $f_i$ of one is within a band frequency range and the frequency $f_{ii}$ of the other one is within another band frequency range. The frequency of each is equidistant from the boundary. The beam splitting subsystem is in optical communication with the source. The beam splitting subsystem is configured to receive the pairs of polarization-entangled frequency-correlated photons and divide the received polarization-entangled frequency-correlated photons into different optical paths by band. A first-band wavelength-selective switch (WSS) is positioned in a first path of the different optical paths and configured to receive polarization-entangled frequency-correlated photons in a first band. The first-band WSS has $M_{ff}$ distribution ports. A second-band WSS is positioned in a second path of the different optical paths, and configured to receive polarization-entangled frequency-correlated photons in a second band. The second-band WSS has $M_{ss}$ distribution ports. The photons entering the first-band WSS are grouped by frequency into N channels of δf-width bins aligned to the ITU grid for control. The photons entering the second-band WSS are grouped by frequency into O channels of δf-width bins aligned to the ITU grid for control, where $N \geq M_{ff}$ and $0 \geq M_{ss}$. The first-band WSS's $j^{th}$ channel associated with a channel frequency $fi_j$ is controllable concurrently with the second-band WSS's $j^{th}$ channel associated with a channel frequency $fii_j$, for channel frequencies that are equidistant from the boundary, where $j=1, \ldots, N$. The network controller has one or more communication interfaces. The network controller is communicatively coupled with the first-band WSS and the second-band WSS and receivers. The network controller is configured to receive a request to provide to first and second optical receivers respective photons of entangled photon pairs. The first optical receiver is coupled through an optical communications network to the first-band WSS's $$a_w^{th}$$

distribution port and the second optical receiver is coupled through the optical communications network to the second-band WSS's $$a_x^{th}$$

distribution port, where $a_w=1, \ldots, M_{ff}$ and $a_x=1, \ldots, M_{ss}$. The network controller is configured to determine if there is available bandwidth to satisfy the request, and cause the first-band WSS to connect the first-band WSS's $j^{th}$ channel to the first-band WSS's $$a_w^{th}$$

distribution port and the second-band WSS to connect the second-band WSS's $j^{th}$ channel to the second-band WSS's $$a_x^{th}$$

distribution port when there is available bandwidth to cause a distribution of photons of entangled-photon pairs to the first and second optical receivers In an aspect of the disclosure, the beam splitting subsystem may comprise one or more dichroic beam splitters. In other aspects, the beam splitting subsystem may comprise one or more wavelength division multiplexer (WDM).

In an aspect of the disclosure, the system may comprise a third-band WSS positioned in a third path of the different optical paths. The third-band WSS has $M_{tt}$ distribution ports. The photons entering the third-band WSS are grouped by frequency into P channels of δf-width bins aligned to the ITU grid for control, where $P \geq M_{tt}$. The third-band WSS's $k^{th}$ channel associated with a channel frequency $fi_k$ is controllable concurrently with the second-band WSS's $z^{th}$ channel associated with a channel frequency $fii_z$, for channel frequencies that are equidistant from the boundary, where $k=1, \ldots, P$; and $z=N, \ldots . O$. The network controller may be further communicatively coupled with the third-band WSS. The network controller may be further configured to receive a request to provide to a third optical receiver and a fourth optical receiver respective photons of entangled photon pairs. The third optical receiver may be coupled through the optical communications network to the third-band WSS's $$a_v^{th}$$

distribution port and the fourth optical receiver may be coupled through the optical communications network to the second-band WSS's $$a_x^{th}$$

distribution port, where $a_v=1, \ldots, M_{tt}$ and $a_x=1, \ldots, M_{ss}$. The network controller may be further configured to determine if there is available bandwidth to satisfy the request, and cause the third-band WSS to connect the third-band WSS's $k^{th}$ channel to the third-band WSS's $$a_v^{th}$$

distribution port and the second-band WSS to connect the second-band WSS's $z^{th}$ channel to the second-band WSS's $$a_x^{th}$$

distribution port when there is available bandwidth to cause a distribution of photons of entangled-photon pairs to the third and fourth optical receivers.

In an aspect of the disclosure, the first-band WSS may be for a C-band, the second-band WSS may be for a L-band, and the third-band WSS may be for S-band.

In an aspect of the disclosure, the network controller may comprise a storage configured to store identifiers associated with spectrally correlated frequencies channels from two different WSSes and status information associated with the identifiers. The status information indicates usage of a channel. In this aspect, the network controller refers to the status information for the spectrally correlated frequencies channels in determining whether bandwidth is available.

In an aspect of the disclosure, the pump laser has a frequency centered on the boundary between the two bands of the multi-band spectrum. In other aspects, the pump laser has a frequency twice the boundary between the two bands of the multi-band spectrum.

DETAILED DESCRIPTION

In accordance with aspects of the disclosure, frequency-correlated (spectrally correlated) entangled pairs of photons may be distributed to quantum resources. The quantum resources may be in the same or a different facility. The entangled pairs of photons may be polarization-entangled. In an aspect of the disclosure, a transmitter provides the frequency-correlated entangled pairs of photons in an on-demand fashion such that the destination of the photon-pair is reconfigurable. In an aspect of the disclosure, the transmitter is capable of providing an ultrabroadband spectrum spanning multiple optical communication bands as defined by the International Standards Union (ITU). The bands may include the original band (O-Band) (about 1260 nm-about 1360 nm), the extended band (E-Band) (about 1360 nm-about 1460 nm), the short band (S-Band) (about 1460 nm-about 1530 nm), the conventional band (C-Band) (about 1530 nm-about 1565 nm), the long band (L-Band) (about 1565 nm-about 1625 nm) and the ultralong band (U-band) (about 1625 nm-about 1675 nm).

In an aspect of the disclosure, the entangled pairs of photons are provided in complementary optical bands. Complementary optical bands used herein means that the frequency/wavelength is equidistant from a center wavelength/frequency used in the transmitter of the target multi-band spectrum. For example, the C-band and L-Band are complementary optical bands. Dependent on the band more than two bands may be complementary optical bands. This is because the number of wavelengths/frequencies in each band may be different. For example, the O-Band is as long as both the C-Band and the L-Band.

In some aspects, the full spectrum of a band may not be used such as the full S-band. However, in other aspects, the full band such as the combination of the full C+L Bands may be used.

In an aspect of the disclosure, the transmitter may have wavelength-selective switches (WSSs) which are individually tailored to the different bands, such as the C-Band and L-Band, respectively, and have their channels aligned to the ITU grid (ITU-T Rec. G.684.1), which provides the flexible grid quantum network. Thus, the transmitter has both a polarization degree of freedom (DoF) and a frequency DoF. In other aspects, the transmitter may have only one WSS, which is capable of individually switching channels from multiple bands.

In an aspect of the disclosure, the transmission of the entangled pairs of photons may be part of a quantum key distribution system (QKD), where the entangled pairs of photons may be used by multiple users to determine quantum-based secret keys, respectively, which enable secure communication.

Figure 1:
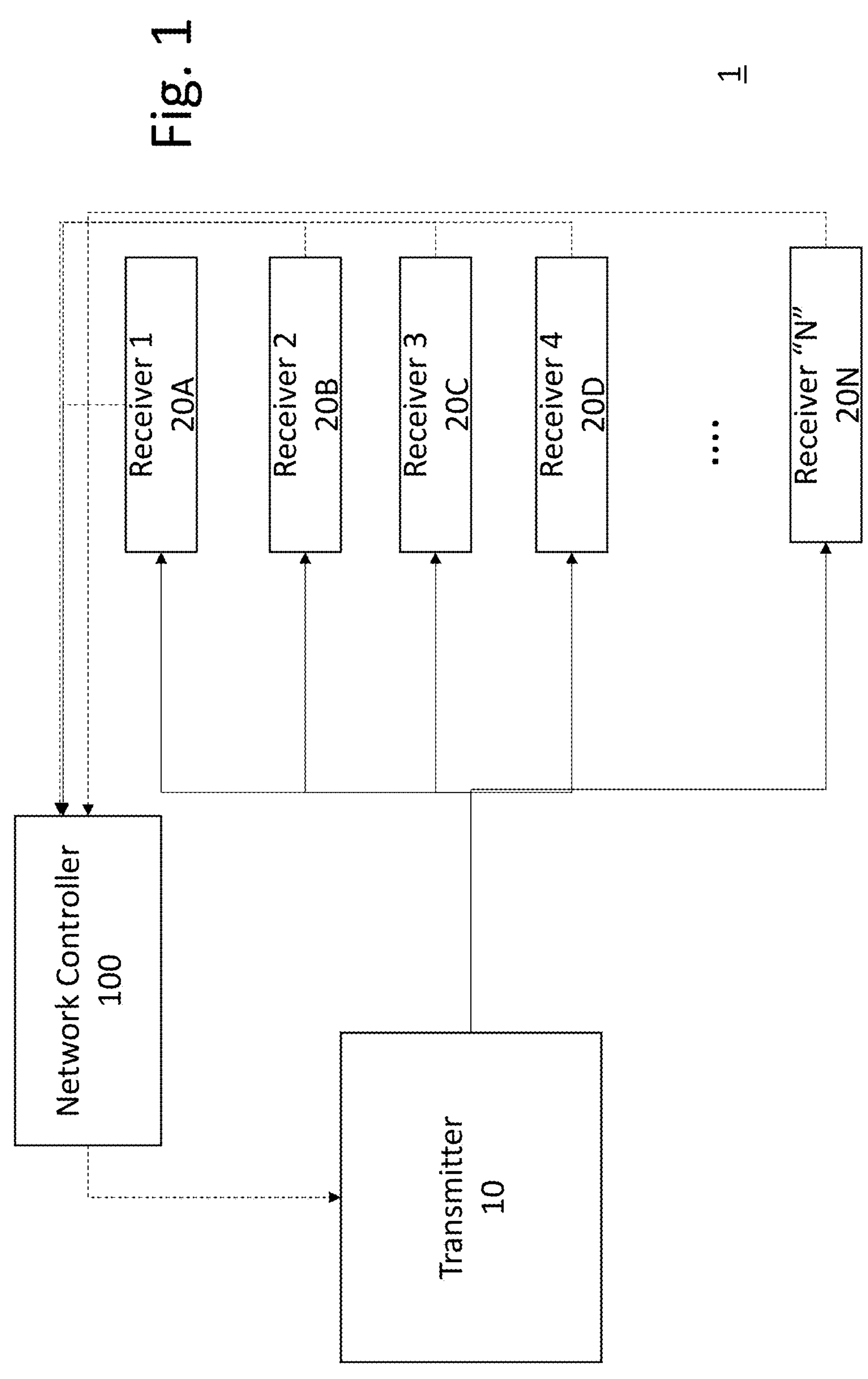
FIG. 1 illustrates a block diagram of a communications network in accordance with aspects of the disclosure.

FIG. 1 illustrates a block diagram of a communications network 1 in accordance with aspects of the disclosure. The communications network 1 comprises an optical transmitter (transmitter 10) and a plurality of optical receivers (Receiver 1 20A through Receiver "N" 20N), in which N is an integer. The communications network 1 also comprises a network controller 100. As shown in FIG. 1, the network controller 100 is separate from the transmitter 10; however, in other aspects, the network controller 100 may be incorporated in the transmitter 10.

While FIG. 1 uses the term "transmitter" 10 and "receivers" 20A-20N, in some aspects of the disclosure, the communication may be bidirectional such as to produce a quantum-based secret key from the entangled pairs of photons.

In some aspects of the disclosure, the transmitter 10 may be communicatively coupled to each receiver (e.g., Receiver 1 20A, Receiver 2 20B, Receiver 3 20C and Receiver 4 20D), via a communication medium such as a fiber optic cable. In some aspects, the fiber optic cable may be a single-mode fiber. The fiber optic cable may be above-ground or in-ground to avoid environmental factors. The environmental factors may include temperature changes and wind motion. In other aspect, part of the fiber optic cable may be in-ground and part above-ground. In other aspects, the receivers 20A-20N may be communicatively coupled via free space. Depending on the relative distance between a receiver (e.g., Receiver 1 20A) and the transmitter 10, different receivers 20A-20N may be connected to the transmitter 10 differently: some via free space and others via fiber optic cable.

When a fiber optic cable is used, the length may be in a range of 1-10 km. In some aspects, the length may be less than 20 km. In some aspects, the length may be less than 1 km. In some aspects, the length may be less than 50 km. In some aspects, the length may be less than 100 km. In other aspects, depending on the application, the length may be more than 100 km. Depending on the distance, intermediate patch panel connections and splices may be used.

In some aspects of the disclosure, the receivers 20A-20N may be in different locations, e.g., remote from each other. For purposes of the description "different locations" or "remote" includes different buildings or facilities. The different buildings may be adjacent buildings, buildings in the same or different town(s) or same or different city(ies). In some aspects, "different locations" or "remote" includes within the same building such as on different floors or even on the same floor in different offices.

Examples of the different locations includes buildings or offices of a single company. For example, one of the buildings may be a home-office or headquarters of a company and other buildings or facilities may be satellite offices or regional offices. The different locations may be different buildings or facilities of a university, college or research facility such as a national lab (campus buildings). The different locations may include, but is not limited to, office networks, sensor networks, data center or repository networks, or instrument networks. The different locations may also be referred to herein as remote network sites or network nodes.

While the receivers 20A-20N may be in different locations as described above, the receivers 20A-20N need not be located in different locations to achieve the functionality described herein.

Since in accordance with aspects of the disclosure, pairs of receivers receive the spectrally correlated, polarization-entangled photon pairs, the two receivers (e.g., Receiver 1 20A and Receiver 2 20B) are referred to herein as a Receiver Pair.

In an aspect of the disclosure, the network controller 100 can communicate with each receiver 20A, 20B . . . 20N and the transmitter 10. The network controller 100 may communicate with the receivers 20A-20N via any communication means such as wired or wireless communication. This communication may be "classical communication". For example, the communication may be to receive a request for spectrally correlated, polarization-entangled photon pair(s). The network controller 100 may transmit a confirmation to the receiver(s) (e.g., Receiver 1 20A and Receiver 2 20B) in response to the request or as will be described later, a denial of the request.

The network controller 100 may be connected to the transmitter 10 via a wired connection. For example, as will be described latter, the transmitter 10 may comprise one or more wavelength selective switches (WSSes). In some aspects, the network controller 100 may be connected to a respective controller of the WSS ("WSS controller"), such as via Universal Serial Bus (USB) connection.

Figure 2:
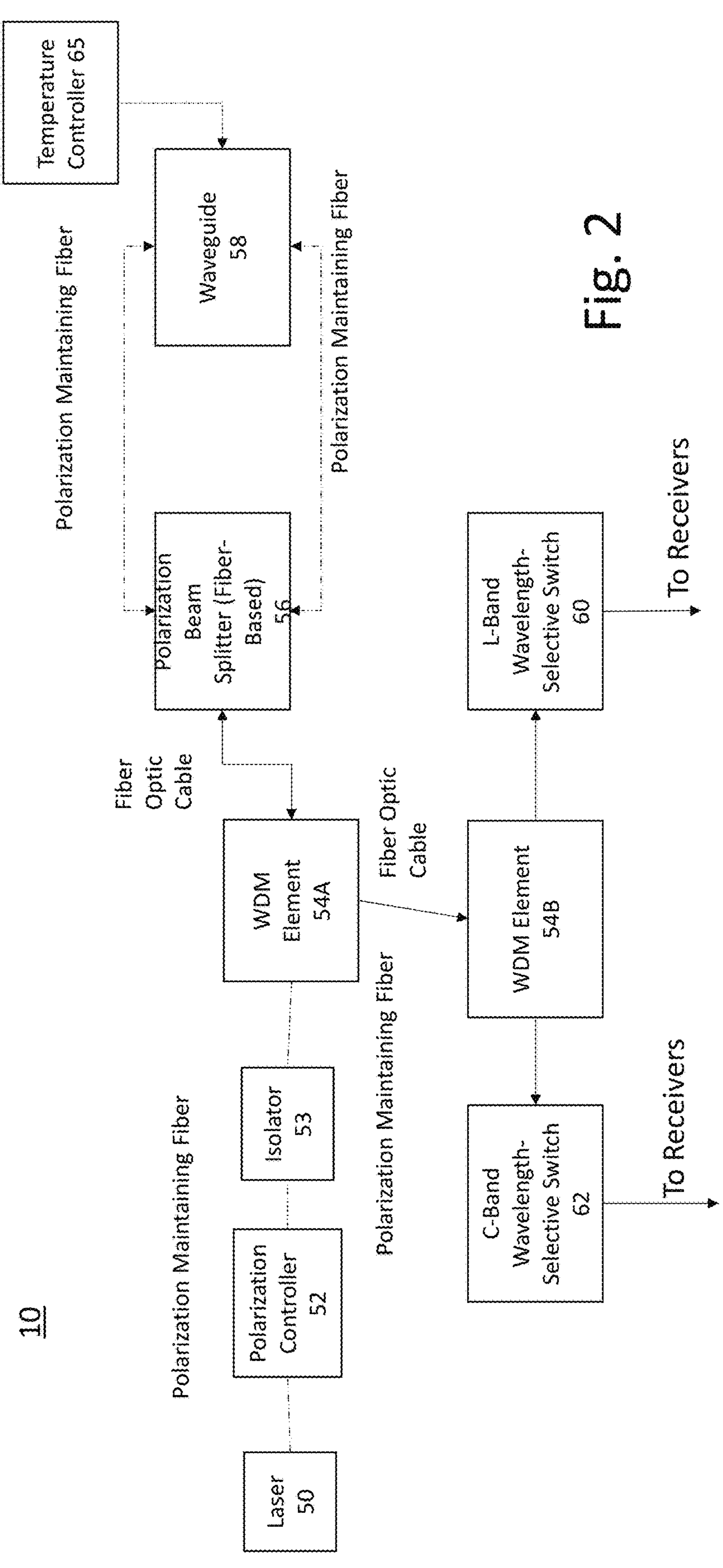
FIG. 2 illustrates a block diagram of an optical transmitter of the communications network in accordance with aspects of the disclosure.

FIG. 2 illustrates a block diagram of a transmitter 10 in accordance with aspects of the disclosure.

The transmitter 10 comprises a light source, e.g., laser 50. The laser 50 may be a frequency-stabilized continuous-wave laser. The laser 50 emits light at a target wavelength/frequency. In an aspect of the disclosure, the target wavelength/frequency is a wavelength/frequency which enables entangled pairs of photons to be "centered" with respect to a target multi-band spectrum (equidistant from a desired wavelength/frequency). For example, where the target multi-band spectrum includes the C-Band and the L-Band, the target wavelength/frequency may enable the centering to be at the border between the two bands. For example, the target wavelength may be about 782 nm, such as, but not limited to 782.748 (e.g., a frequency of about 383 (THz), which enables the centering at about 1565 nm, such as, but not limited to 1565.496 nm (e.g., a frequency of about 191.5 THz). The light may have a power of less than 10 mW.

The light from the laser 50 may be amplified, as needed (amplifier not shown). For example, the laser 50 may be connected via a polarization maintaining fiber optic cable ("PMF") to an external amplifier. In other aspects, the laser 50 may have an internal tunable amplifier. The PMF may be a 780 nm fiber.

The transmitter 10 also comprises a polarization controller 52. The polarization controller 52 includes a polarizer configured to output light having a target polarization. The polarizer may be set on a rotating stage, where the angle of the polarizer is controllable to set the polarization of the light to the target polarization. In some aspects, the target polarization of the light output from the polarization controller 52 is a diagonal polarization, e.g., halfway between a vertical polarization and a horizontal polarization. The reason is that the transmitter also includes a polarization beam splitter 56 downstream of the polarization controller 52 and a diagonal polarization enables the divided light output of the PBS to be about 50% of the input power.

The transmitter 10 may also comprise a WDM element 54A connected to the polarization controller 52. The connection may be via a PMF. This PMF may also be a 780 nm fiber. The WDM element 54 may be a coarse wavelength division multiplexer (CWDM). The CWDM is configured to separate the target multi-band spectrum output from a Sagnac loop from the remaining light about the wavelength/frequency of the laser 50. In some aspects, the WDM element 54A may be a 780/1550 CWDM.

In an aspect of the disclosure, in the light path between the polarization controller 52 and the WDM element 54A, an optical isolator 53 may be positioned. The optical isolator 53 allows light to propagate in one direction, e.g., from the polarization controller 52 to the WDM element 54A and prevents light from propagating back. Since the target wavelength/frequency (source wavelength/frequency) is separated from other bands by the WDM element 54A, the source wavelength would return to the laser 50 if the optical isolator 53 is not present.

The transmitter 10 also comprises a polarization beam splitter (PBS) 56. In some aspects, the PBS 56 may be fiber-based. For example, the PBS 56 may be connected to the WDM element 54A via a fiber, such as a fiber optic cable. This fiber optic cable is not a PMF in order to avoid walk off, which may destroy the entanglement. This fiber optic cable has multiple wavelength/frequency bands including the target wavelength/frequency (source wavelength/frequency) and the target multi-band spectrum. Therefore, the fiber optic cable may be a 980 nm fiber, which is between the source wavelength/frequency and the target multi-band spectrum.

The PBS 56 outputs two mutually orthogonal polarized components: vertical polarization (V) and horizontal polarization (H). One polarized component may be output to a first polarization maintaining fiber and a second polarized component may be output to a second polarization maintaining fiber. The light propagates along the slow axis within the PMFs. The components may propagate in either direction (clockwise or counterclockwise (also referred to as forward and backward). One of the PMFs is rotated 90 degrees such that when the light enters the waveguide 58, in both directions, the light has the same polarization: both horizontal (H) or both vertical (V). The PMF within the Sagnac loop may be configured for a wavelength between the pump (source) and the target multiple optical communication bands. For example, the PMF may be configured for 980 nm.

In an aspect of the disclosure, both PMFs have about the same length (distance) so as not to impart a relative delay between them.

The transmitter 10 further comprises a waveguide 58. Both PMFs are connected to the waveguide 58. The waveguide 58 may be a nonlinear crystal. The waveguide 58 is configured to produce the entangled pairs of photons. For example, the waveguide 58 is configured for spontaneous parametric down-conversion (SPDC). A single photon, e.g., pump, converts into a pair of photons (with lower energy which add to the energy of the pump photon). The pair of photons may have the same polarization as the original photon, where the spectrum is correlated. Thus, the SPDC provides spectrally correlated, polarization-entangled photon pairs.

The SPDC may be type-0. Thus, the produced photon pairs may either be V or H depending on the polarization of the input. For example, if V, the nonlinear crystal converts the vertically polarized pump photons $|V_p>$ to $|V V>$.

The waveguide 58 may be made of one or more nonlinear materials. For example, nonlinear material may include lithium niobate. However, the nonlinear crystal may have a small channel differentiated from the rest of the nonlinear crystal by index of refraction contrast which guides the light propagating through it, other nonlinear materials may be used, such as, but not limited to include potassium titanyl phosphate or beta barium borate.

The waveguide may be periodically poled such as a PPLN waveguide.

The nonlinear material (crystal) may be formed into a target shape. For example, the target shape may be a ridge waveguide. The length and the material of the waveguide 58 impacts the output spectrum, e.g., bandwidth which that waveguide 58 can output. For example, a longer waveguide 58 (same material) may output a smaller bandwidth. The length of the waveguide 58 may be set based on the target multi-band spectrum. For example, for fully filling the C-Band and L-Band, the length of a PPLN ridge waveguide may be about 12 mm. In an aspect of the disclosure, the length of the PPLN ridge waveguide may be less than about 15 mm to achieve a fully filled C-Band and L-Band, e.g., with a full-width at half-maximum SPDC bandwidth of the PPLN ridge waveguide at least as large as the C-band and L-band.

The performance of the waveguide 58 (i.e., SPDC efficiency) is affected by the temperature. Therefore, the transmitter 10 also comprises a temperature controller 65. The set point, once again, may be based on the target multi-band spectrum and the input wavelength/frequency. In an aspect of the disclosure, the generated spectrally correlated, polarization-entangled photon pairs evenly fill the target multi-band spectrum. For example, spectrally correlated, polarization-entangled photon pairs evenly fill both the C-Band and the L-Band. The temperature of the waveguide 58 may be controlled via the temperature controller 65 to achieve his roughly even distribution for the given input wavelength frequency, which may be, e.g., 1565.496 nm/191.5 THz (as described above).

For example, in some aspects of the disclosure, the waveguide 58 may be controlled to provide spectrally correlated, polarization-entangled photon pairs centered at said wavelength/frequency and spanning about 18 THz (or more), which is 150 nm (e.g., +/− about 75 nm from 1565.496). This encompasses the bands of at least the S-Band, the C-Band, the L-Band and the U-Band. Additionally, the operating temperature is waveguide 58 specific.

In an aspect of the disclosure, the PBS 56, the waveguide 58 and the PMFs form the Sagnac loop.

The output of the waveguide 58 returns to the PBS 56 via the same PMFs. Polarization-entangled states produced within the waveguide 58 exit the PBS 56 to the WDM 54 as $\alpha\,|HH>+\beta|V V>$. The weights are determined by the incident laser polarization and any loss imbalance, e.g., probability of the amplitudes. The polarization controller 52 is used to set the weights. As described above, the polarization controller 52 may change the polarization angle. The angle may be set during a configuration phase to maximize entanglement of the output photon pairs.

Spectrally correlated, polarization-entangled photon pairs may be routed back through the WDM element 54A via the same fiber optic cable supplying the source. The WDM element 54A separates the spectrally correlated, polarization-entangled photon pairs and may route them to WDM element(s) 54B. The number of WDM elements 54B depends on the number of bands in the target multi-band spectrum. For example, if the target multi-band spectrum only includes the C-Band and the L-Band, one WDM element 54B may be used. The WDM element 54B separates the light into the C-Band and L-Band.

However, in other aspects, if the target multi-band spectrum also includes the S-Band and the U-Band, there may be additional WDM elements, respectively, in series with the WDM element 54B, one to separate the S-Band from the C-Band and the other to separate the L-Band from the U-Band.

The transmitter 10 has one or more WSSes. As shown in FIG. 2, the transmitter 10 has two WSS 60, 62: one for the C-Band (WSS 62) and one for the L-Band (WSS 60). The WDM element 64B may be connected to the WSS 60, 62 via fiber optic cables. The WSS 60, 62 may be from Coherent Corporation.

The number of WSSes may be the same as the number of bands in the target multi-band spectrum. However, one WSS may be able to switch individual channels in the multiple bands.

A WSS 60, 62 has an input port 300. A fiber optic cable may be connected to the input port. Each WSS 60, 62 also has a plurality of output ports OP1-OPM. The number of the output ports may be different depending on the WSS. Additionally, the number of output ports may depend on the band since the width of different bands may be different. For example, the width of the L-Band is larger than the width of the C-Band.

A WSS allows for individual frequencies/wavelengths to be controlled in a group to be routed to a particular output port, respectively. The group frequencies/wavelengths define a channel. Each WSS has a plurality of controllable channels. In an aspect of the disclosure, each defined channel within a WSS is aligned with an ITU grid. Each channel width (number of wavelengths/frequencies bins with a channel) may also be consistent with the ITU grid. The flexible ITU grid includes channel widths that are integer multiples of 12.5 GHZ and center frequencies on a 6.25 GHz-spaced grid. The number of controllable channels within the WSS is inversely proportional to the channel width. In an aspect of the disclosure, the channel width may be based on a measured peak loss on the WSS filter. In an aspect of the disclosure, the channel width may be a minimum of 25 GHz based on this peak loss with the slot edges aligned to the 12.5 GHZ ITU grid. However, in other aspects, the minimum channel width may be 12.5 GHz with the slot edges aligned to the 12.5 GHZ ITU grid. The network controller 100 may define the channels (in conjunction with a respective WSS controller). In an aspect of the disclosure, different channels may have different channel widths. For example, one channel may have a width of 25 GHz while another channel may have a width of 50 GHz. In accordance with this aspect of the disclosure, one channel may be spectrally correlated with two different channels. For example, the one 50 GHz channel may be spectrally correlated with two 25 GHz channels.

Figure 3:
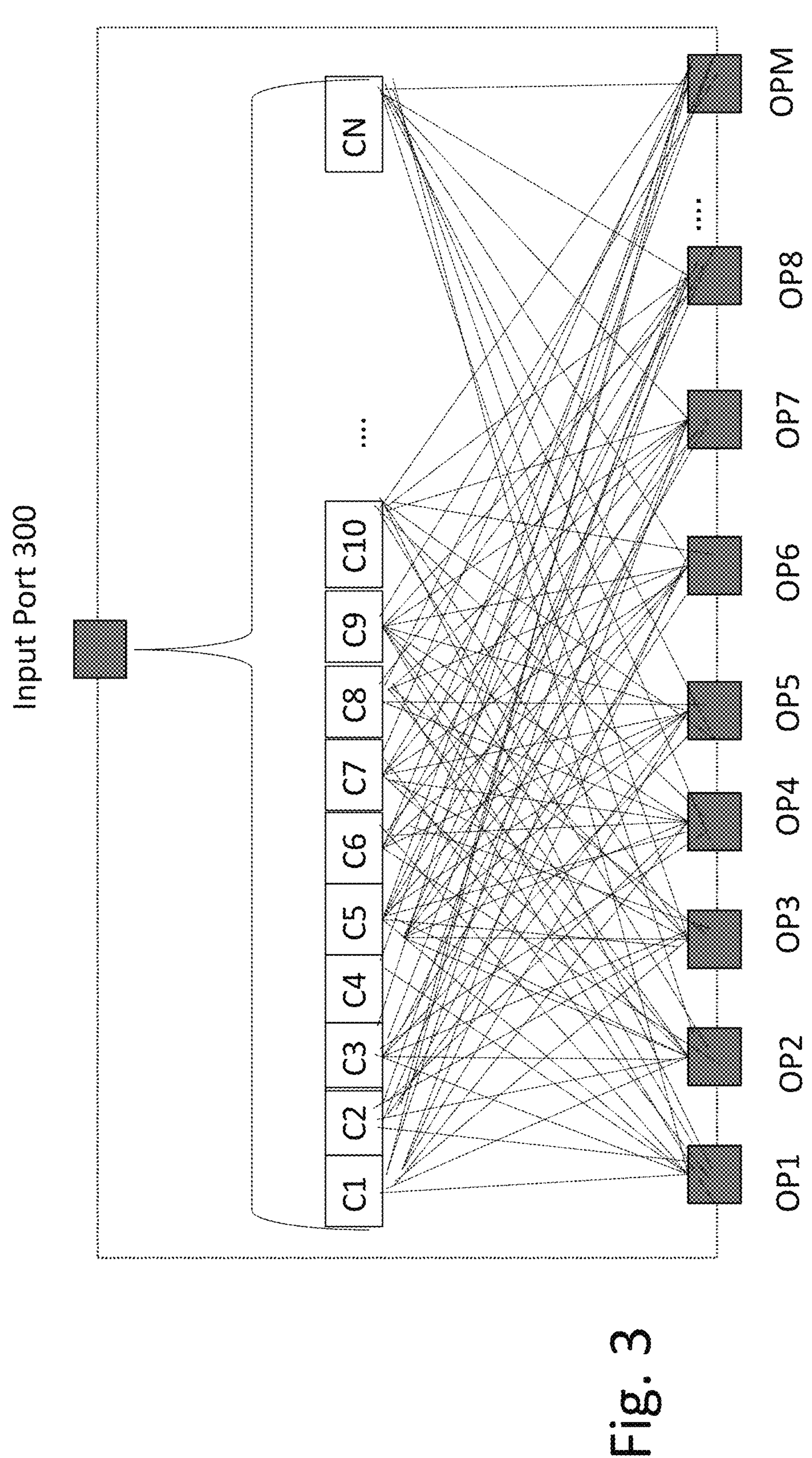
FIG. 3 illustrates an example of independently controllable and addressable on-demand channels in a wavelength-selective switch in accordance with aspects of the disclosure.

As shown in FIG. 3, any channel C1-CN may be selectively routed to any output port OP1-OPM. However, since the photons are spectrally correlated, polarization-entangled photon pairs, depending on the number of output ports in each WSS (e.g., WSS 60, 62), not all ports may be used. The number of simultaneously connected pairs of receivers may limited by the minimum number of ports in the C-Band WSS 62 and the L-Band WSS 60 (in a two-band system).

In an aspect of the disclosure, a WSS (e.g., WSS 60, 62) may include a liquid crystal on silicon (LCOS) 2-dimensional (2D) array. The LCOS 2D array has a plurality of individually controllable portions which are available to selectively switch the Channels defined above between output fibers (internal to the WSS). Each WSS (e.g., WSS 60, 62) has a plurality of output fibers, respectively optically connected with the output ports OP1-OPM. The WSS (e.g., WSS 60, 62) may also comprises a diffraction grating which is configured to divide the input light into different wavelengths/frequencies. Light entering the input port 300 may be routed from the input port 300 to the diffraction grating. The routing may include input fiber, an imaging mirror(s) and optics. The dispersed light from the diffraction grating returns through the optics and imaging mirror to the LCOS 2D array. The diffraction grating disperses the light, annularly, such that the different wavelengths/frequencies are routed to different portions of the LCOS 2D array such as horizontally or vertically. For example, different wavelengths/frequencies may be sent to different horizontal portions of the LCOS 2D array. The same wavelengths/frequency may occupy different vertical portions of the LCOS 2D array based on light divergence. A WSS controller is coupled to the LCOS 2D array. The WSS controller causes different defections from the LCOS 2D array which causes the light to be sent to target output fiber(s) and output port(s). The WSS controller may control the LCOS 2D array by selectively applying different voltages to different "pixels" of the array.

A WSS (e.g., WSS 60, 62) is not limited to including a LCOS 2D array and other reconfigurable devices may be used (including other reconfigurable optical add/drop multiplexers (ROADM)).

Figure 4:
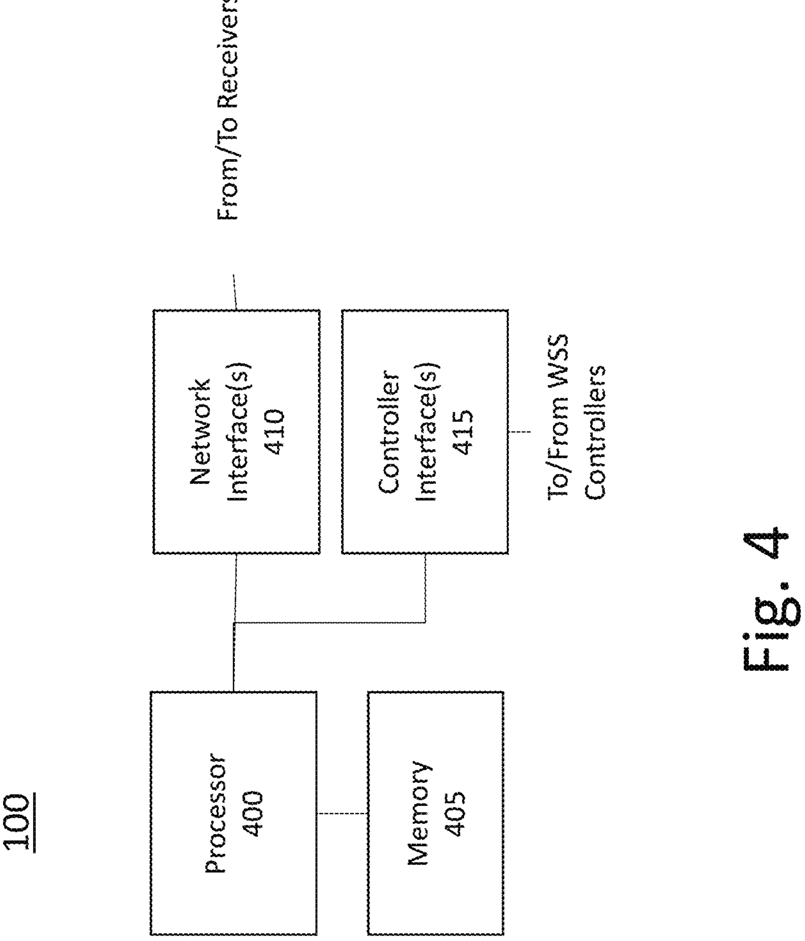
FIG. 4 illustrates a block diagram of a network controller in accordance with aspects of the disclosure.

In an aspect of the disclosure, a WSS controller may be instructed by the network controller 100 for the selection of the output port OP1-OPM, e.g., switching (routing the light to different output fibers). FIG. 4 illustrates a block diagram of a network controller 100 in accordance with aspects of the disclosure. The network controller 100 may comprise a processor 400, memory 405, network interface(s) 410 and controller interfaces 415. The processor 400 may be a CPU. In other aspects, the processor 400 may be a microcontroller or microprocessor or any other processing hardware such as a field programmable gate array (FPGA). The processor 400 may be configured to execute one or more programs stored in a memory (such as memory 405) to execute the functionality described herein.

In accordance with aspects of the disclosure, the memory 405 may store the channel definitions (e.g., a channel list). The memory 405 may store the channel definitions for the different channels in the multi-band spectrum. For example, in a two WSS system (e.g., WSS 60 and WSS 62), the memory 405 may store the channel definitions for the C-Band WSS 62 and store the channel definitions for the channels in the L-Band WSS 60. Since in accordance with aspects of the disclosure, spectrally correlated, polarization-entangled photon pairs are generated, the memory 405 also has a mapping associating the spectrally correlated channels. This mapping enables the processor 400 to identify the corresponding channels and simultaneously control the same, as needed, to fulfill a request.

The simultaneous control may be on the same WSS if the WSS has multiband capability or different WSSes as shown in FIG. 2.

In some aspects of the disclosure, the channels may be numerically coordinated, e.g., channel 1 C-Band, channel 1 L-Band, etc. In some aspects, the channels closest to the boundary (e.g., about 1565 nm/191.5 THz) may be assigned an identifier Channel 1 and the numerical identifiers increase as the distance from the boundary increases (in both directions). Thus, Channel 1 C-Band would correspond to Channel 1 L-Band and Channel 2 C-Band would correspond to Channel 2 L-Band and Channel "Z" C-Band would correspond to Channel "Z" L-Band.

However, as described above, the number of channels in each band may be different depending on the number of wavelengths/frequencies in each band. For example, the L-Band may have more channels than the C-Band. Therefore, a channel in the L-Band may correspond to a channel in the S-Band. For example, Channel "ZZ" L-Band, may correspond to Channel "II" in the S-Band.

Instead of numbers, any unique channel identifier may be used.

The channel list (and mapping) may also include an identifier of the WSS such that the processor 400 knows which WSS (WSS controller) to send the control signal to.

In an aspect of the disclosure, the memory 405 may also store a status of each output port (e.g., OP1-OPM). In some aspects, the status may be tracked per WSS (e.g., WSS 60, 62). The status may include connected (not available) or available (open). The "open" or "available" status means that no receiver is "connected" to a given port. The receiver "connected", or "not available" status means that a receiver is "connected". "Connected" used herein is separate from active traffic transmission. For example, a receiver (e.g., Receiver 1 20A) may be physically connected to the output port (e.g., OP1), but no network traffic is being transmitted. The receiver (e.g., Receiver 1 20A) may also be connected to an output port (e.g., OP1) via free space as opposed to fiber-based.

In some aspects of the disclosure, the status may also include a unique identifier of the receiver (e.g., Receiver 1 20A) connected to the output port (e.g., OP1). The unique identifier may be a network address such as an IP address, a MAC address or identifier identifying the receiver (e.g., Receiver 1 20A).

In an aspect of the disclosure, the memory 405 may also store an allocation status. The allocation status identifies which Pairs of Channels (Corresponding Channels) are active (in use) and which are available. The allocation status may also identify the pair of recipients (Receiver Pair) using the unique identifier of the receivers (e.g., Receiver 1 20A, Receiver 2 20B). This information may be used to identify when a particular pair of recipients requests additional bandwidth. In some aspects, the number of Pairs of Channels to a particular pair of recipients may be limited to a preset maximum number of Pairs of Channels.

The network interface(s) 410 may be wired or wireless interface(s). The wireless interfaces may be a Wi-Fi® interface. Additionally, depending on the location of any receiver, the wireless interface may be a near-field communication interface. The network controller 100 is able to receive requests for spectrally correlated pairs of channels from the receivers 20A-20N via the network interface(s) 410. The network interface(s) 410 may be different for different receivers. For example, some of the receivers (e.g., Receiver 1 20A, Receiver 2 20B) may be connected to a wired network interface, whereas others (e.g., Receiver 3 20C, Receiver 4 20D) may be connected wirelessly. In some aspects, the network may be password protected.

The controller interface(s) 415 may include one or more serial interfaces such as USB. The number of controller interfaces 415 may depend on the number of WSSes, where each WSS controller is connected to a different controller interface 415.

In an aspect of the disclosure, the receivers 20A-20N may be time synchronized. This is to enable the receivers to identify spectrally correlated, polarization-entangled photon pairs. In some aspects, the time may be synchronized by global positioning system (GPS), the precision time protocol (PTP) (including a high-accuracy version with White Rabbit™) or the network time protocol (NTP). In some aspects, the network controller 100 may also be time synchronized with the receivers 20A-20N using a similar means. Since the distance from a receiver (e.g., Receiver 1 20A) to the transmitter 10 may be different from distance from another receiver (e.g., Receiver 2 20B) to the transmitter 10, there may be a delay in receiving the spectrally correlated, polarization-entangled photon pairs in the Receiver Pairs. This delay may be a priori known.

In some aspects, instead of using the above protocols, when a receiver (e.g., Receiver 1 20A) is connected to an output port (e.g., OP 1), the receiver (Receiver 1 20A) may share its clock or transmit a synchronization signal to the network controller 100 via the network interface 410. The synchronization signal may be used to determine the delay.

In an aspect of the disclosure, when receivers 20A-20N connect to any output port OP1-OPM of the WSS, the WSS controller identifies this connection and the identifier of the receiver (e.g., Receiver 1 20A) and transmits the connection status with the identifier to the network controller 100 via the controller interface 415. In response, the processor 400 updates the information in memory 405. Similarly, when a receiver (e.g., Receiver 1 20A) disconnects from an output port (e.g., OP1) of a WSS, the corresponding WSS controller identifies the disconnection (and identifier) and transmits the connection status (with identifier) to the network controller 100 via the controller interface 415 such that the status information is updated in the memory 405.

Figure 6:
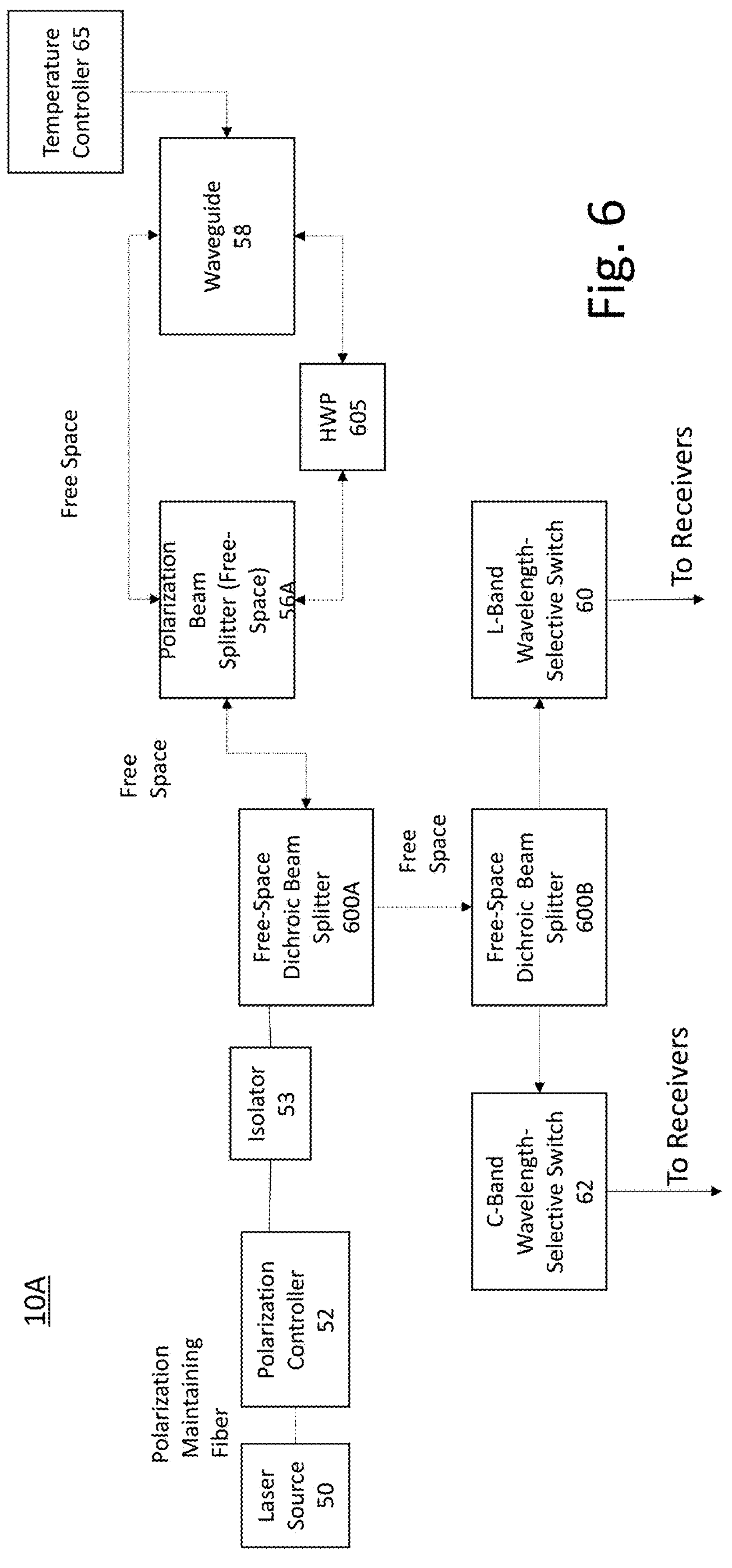
FIG. 6 illustrates a block diagram of an optical transmitter of the communications network in accordance with other aspects of the disclosure.

The transmitter 10 is not limited to being fiber-based, in other aspects, as illustrated in FIG. 6, the transmitter 10A may be free space-based. Similar to above, the laser source 50 may be connected to the polarization controller 52 via a PMF, however, the other components may be in optical communication using free space. Additionally, instead of the WDM elements 54A, 54B, the splitting of the light into different paths by wavelengths/frequencies is achieved using free-space dichroic beam splitters 600A, 600B. The free-space dichroic beam splitters 600A, 600B may be positioned in the same location as the WDM elements 54, 54B. The free-space dichroic beam splitters 600A, 600B may improve the through-put from the laser source.

Additionally, in one of the clockwise or counterclockwise paths in the Sagnac loop, a halfwave plate (HWP) 605 may be inserted to rotate the polarization instead of rotating the PMF, e.g., such that when the light enters the waveguide 58, in both directions, the light has the same polarization: both horizontal (H) or both vertical (V). Additionally, the Sagnac loop would include a free-space PBS 56A as opposed to a fiber-based PBS 56.

In other aspects, the transmitter 10 may have a mix of free space-based communication and fiber-based communication.

Figure 7:
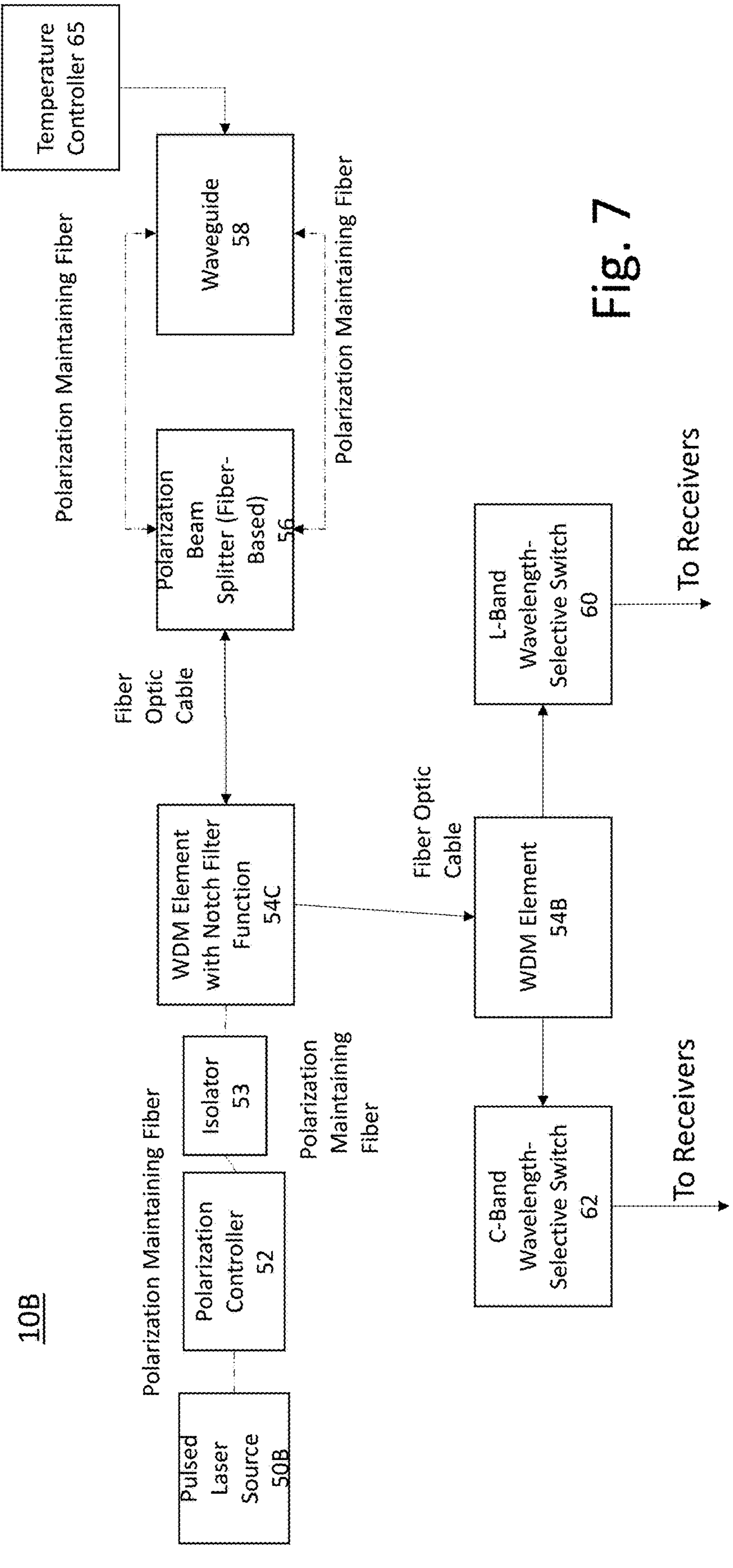
FIG. 7 illustrates a block diagram of an optical transmitter of the communications network in accordance with other aspects of the disclosure.

In another aspect of the disclosure, the waveguide 58 may provide both SPDC, as described above, and second-harmonic generation (SHG) (cascaded) such as shown in FIG. 7. When the pump first enters the waveguide 58, SHG occurs. Afterwards, the SPDC occurs within the waveguide 58. In accordance with this aspect, the laser source may be a pulsed laser source 50B instead of a continuous laser source. In some aspects of the disclosure, the width of the pulse may be determined in a configuration phase. The efficiency of the SHG in the waveguide 58 may be controlled by the pulse width. Shorter pulses may lead to a more efficient SHG, e.g., more spectrally correlated, polarization-entangled photon pairs. In some aspects of the disclosure, the pulse width may be ns. The use of a pulsed laser also enables the instantaneous power of the laser to be increased. In some aspects of the disclosure, the pulsed laser source 50B may have a power of 10 mW or more. The power of the continuous laser may be less than 10 mW. The power and pulse width may be determined prior to implementation.

Since the waveguide 58 produces the SHG, the wavelength/frequency of the pulsed laser source 50B may match the center wavelength/frequency of the target multi-band spectrum. In some aspects of the disclosure, the pulsed laser source 50B may have a wavelength of about 1565 nm. Advantageously, by using a pulse laser source 50B which matches the center wavelength/frequency, standard 1550 nm fibers may be used. The ability to use these standard fibers minimizes the insertion loss for the fibers. Additionally, the PBS 56 is more efficient at the 1550 nm ranges than the 780 nm range and thus the loss is reduced by using the pulsed laser source having a wavelength near 1550 nm.

However, since the pulsed laser source is within the target multi-band spectrum, there may be unconverted photons remaining after passing through the waveguide 58. Therefore, in accordance with aspects of the disclosure, the transmitter 10 also comprises a WDM element 54C having a notch filter function downstream of the PBS 56 to remove the unconverted light at the pulsed laser source wavelength/frequency. In other aspects, a circulator may be positioned between the isolator 53 and the PBS 56. A separate notch filter may be incorporated between the circulator and the WDM element 54B. One light path would be from the isolator 53 through the circulator to the PBS 56 and the return path would be from the PBS 56 to the circulator and the notch filter to the WDM element 54B. In some aspects, the effect of the notch filter is to suppress the unconverted light by about 60 dB or more. In some aspects, the suppression is about 100 db.

The peak power of the pump which enters the waveguide 58 in the transmitter in FIG. 7 may be higher than the power in the other aspects of the disclosure, and therefore, even using the SHG, the number of spectrally correlated, polarization-entangled photon pairs may be the same or more than the transmitter 10, 10A in other aspects.

Although in FIG. 7, the transmitter 10B is fiber-based, the transmitter 10B may also be free-space-based similar to transmitter 10A.

Figure 5:
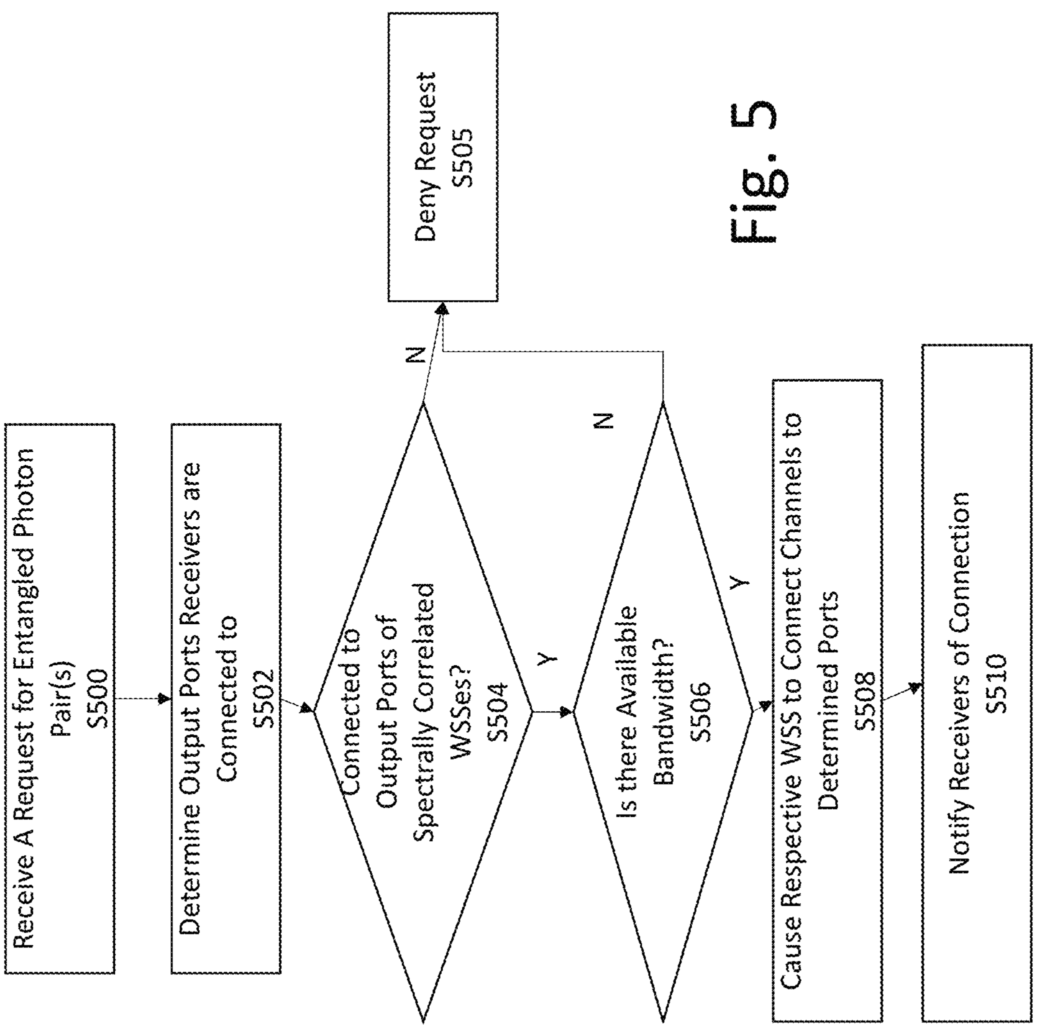
FIG. 5 illustrates an example of a method of on-demand distribution of polarization-entangled pairs of photons in accordance with aspects of the disclosure.

FIG. 5 illustrates a method for on-demand distribution of spectrally correlated, polarization-entangled photon pairs in accordance with aspects of the disclosure. The method is executed by a processor 400 in the network controller 100. At S500, the processor 400 receives a request for a spectrally correlated, polarization-entangled photon pair(s) via the network interface(s) 410. In an aspect of the disclosure, the request may be submitted by one receiver (e.g., Receiver 1 20A) of the Receiver Pair (e.g., Receiver 1 20A and Receiver 2 20B). The request may comprise the unique identifier of the requesting receiver and the unique identifier of the other receiver in the Receiver Pair. In other aspects, a separate request may be submitted by each receiver (e.g., Receiver 1 20A, Receiver 2 20B) in the Receiver Pair (e.g., Receiver 1 20A and Receiver 2 20B). Each separate request may include the identifier of the receiver transmitting the request. This request may include a timestamp of the request. The timestamp may be used by the processor 400 to identify the Receiver Pair. For example, if two separate requests are received within a preset period of time, the requesting receivers may be deemed a Receiver Pair. The requests may be received before or after the respective receivers are connected to any output port OP1-OPM.

In some aspects of the disclosure, the request may be a general request for any spectrally correlated, polarization-entangled photon pair(s) such as shown in FIG. 5. However, in other aspects, the request may be for a specific pair of Channels, e.g., specific spectrally correlated, polarization-entangled photon pair(s). The request may be for a single pair of spectrally correlated channels. In other aspects, the request may be for multiple pairs of spectrally correlated channels.

In an aspect of the disclosure, in response to receiving the request(s), the processor 400 may determine whether there are two available output ports for the requesting receivers to connect to (if the request is received prior to connection). The processor 400 may refer to the output ports status information in the memory 405. If there are no output ports available, (or not enough for the Receiver Pair) the processor 400 may deny the request(s). In other aspects, the processor 400 may issue a notification to the requesting receivers to wait for an open pair of output ports.

At S502, the processor 400 determines which output port(s) OP1-OPM the Receiver Pair is connected to (if any). The processor 400 may check the output port status information stored in memory 405. For example, since the request(s) include the unique identifier of the receivers in the Receiver Pair, the processor 400 uses these unique identifiers to match identifiers of connected receivers to the output ports OP1-OPM previously received from the WSS controller. When there is a match, the processor 400 determines the port number associated with the match. Additionally, if there is more than one WSS, the processor 400 also determines which WSS (e.g., 60, 62) is associated with the port number.

In an aspect of the disclosure, if the request is received prior to the requesting receiver(s) being connected to an output port, respectively, the processor 400, in response to receiving the request, may poll each WSS controller for the status of each port. In some aspects, the polling may be periodic after receiving the request. In response to the polling, each WSS controller transmits the status of each output port to the processor 400.

When the processor 400 receives a matching identifier for the unique identifier of a requesting receiver, the processor 400 determines the port number associated with the match. Similar to above, if there is more than one WSS, the processor 400 also determines which WSS (e.g., 60, 62) is associated with the port number.

The processor 400 may remain at S502 until the processor 400 determines that both receivers (e.g., Receiver 1 20A and Receiver 2 20B) of the Receiver Pair are connected to output port(s) OP1-OPM. In some aspects, if a preset period of time from the request(s) is exceeded without the requesting receivers being connected to an output port OP1-OPM, the processor 400 may issue a timeout error and deny the request. In other aspects, if the preset period of time from the request(s) is exceeded without the requesting receivers being connected, the processor 400 may issue a reminder notification to connect the requesting receiver(s) to the output port(s) OP1-OPM.

At S504, the processor 400 determines if the Receiver Pair is connected to output ports of spectrally correlated WSS(es). As described above, the transmitter 10 may have multiple WSSes (e.g., 60, 62). Therefore, since channels in different WSS may be spectrally correlated channels, the processor 400 at S504, determines if the output ports determined in S502 are associated with WSSes where the channels are spectrally correlated. If the Receiver Pair is connected to output ports of the same WSSes (in the multi-WSS configuration), the channels are not likely to be spectrally correlated and therefore, the request cannot be satisfied. In response to determining that the Receiver Pair is connected to the same WSS (in the multi-WSS configuration), the processor 400 denies the request at S505.

Additionally, in a multi-WSS system where there are more than two WSS, not all of the WSSes may have spectrally correlated channels. Therefore, even if the requesting receivers are connected to different WSSes, the different WSSes may not also have spectrally correlated channels. In an aspect of the disclosure, the processor 400 may determine the associated WSS with the determined ports in S502 using WSS identifier in memory 405.

The processor 400, at S505 may transmit a notification to each of the requesting receivers via the network interface(s) 405. The notification may indicate an instruction to disconnect one of receivers and move to another WSS. In some aspects, the processor 400 will specify the WSS which has a spectral correlated channel to the receivers to facilitate proper connection. The processor 400 may refer to the channel list in memory 405.

In a single WSS system, S504 may be omitted.

In other aspects of the disclosure, in response to receiving a request(s), the processor 400 may determine the available ports in different WSSes where the channels may be spectrally correlated and specify the two WSSes for the requests receivers to connect to (and in some cases, the specific output ports). In this aspect of the disclosure, in S504, the processor 400 may confirm that the requesting receivers are in fact connected to the specified WSS(es) or in some cases, the specified output ports. If the processor 400 determines that the requesting receivers are not connected to the specified WSSes (or in some cases, the specified output ports), the processor 400 may deny the request at S505. The processor 400 may issue an instruction to move the connection(s).

If at S504, the processor 400 determines that the connections are to spectrally correlated WSSes (where pairs are channel may be spectrally correlated) (Y at S504), the processor 400 then determines if there is available spectrally correlated bandwidth for each of the WSSes (e.g., 60, 62). The available bandwidth may be determined using the channel allocation information in the memory 405 and channel mapping information such as in the channel list.

If the request is a general request for any spectrally correlated, polarization-entangled photon pair(s) (any spectrally correlated channels), then the processor 400 determines whether any spectrally correlated pair(s) of channels are available (not in use). If the processor 400 determines that there is available bandwidth (at least one available spectrally correlated channel), the processor 400 issues an instruction at S508 to the WSS controller(s) via the controller interfaces 415, respectively, to cause a specified pair of channels to be connected to the determined ports in S502. The processor 400 also updates the allocation information in memory 405. The processor 400 may also notify the Receiver Pair of the switching and distribution, e.g., confirmation of the request. This notification may include a timestamp of the switching and distribution.

If there is no available bandwidth, e.g., no spectrally correlated pair(s) of channels are available, or in a case where the request is for multiple spectrally correlated pairs of channels and there are not sufficient spectrally correlated pairs of channels available to meet the full request, the request may be denied at S505. In some aspect, the processor 400 may partially fill the request, e.g., provide any available spectrally correlated pairs of channels (but not all of the requested bandwidth). In a case of partial fulfillment, the processor 400 may transmit a notification to the Receiver Pair via the network interface 410 indicating the number of spectrally correlated pairs of channels provided (and/or number of spectrally correlated pairs of channels not provided).

If the request is for a specific pair of spectrally correlated, polarization-entangled photon pair(s) (a specific pair of spectrally correlated channels), the method includes an additional function of determining whether the specific pair of spectrally correlated channels is available and if the specific pair of spectrally correlated channels is not available, the request is denied at S505. In some aspects, the processor 400 may issue a notification indicating that other spectrally correlated channels may be available.

In an aspect of the disclosure, the same Receiver Pair, after the initial request, may transmit to the processor 400, a supplemental request for additional bandwidth, e.g., more spectrally correlated channels. Similar to above, if there are available spectrally correlated channels, the processor 400 issues an instruction to the WSS controller(s) via the controller interface(s) 415, respectively, to connect available spectrally correlated channels to meet the supplemental request. If there are no available spectrally correlated channels, the processor 400 may deny the request (S505).

In an aspect of the disclosure, there may be a set maximum number of pairs of spectrally correlated channels allowed for a Receiver Pair. In this aspect, prior to S508, the processor 400 may determine whether the request exceeds the maximum (or supplemental request plus all current allocation). If the request exceeds the maximum, the processor 400 may deny the request at S505. The processor 400 may issue a notification providing the reason for denial. This may prompt a renewed request (or supplemental request) for a lower number of pairs of spectrally correlated channels.

In an aspect of the disclosure, the spectrally correlated, polarization-entangled photon pair(s) may be used by the Receiver Pair(s) in various different applications. These applications may include teleportation, quantum sensing and generating a quantum-based secret key for secure communication. The application may dictate the duration of the distribution (in time) of the spectrally correlated, polarization-entangled photon pair(s) and connection of the Receiver Pairs to the WSS(es) (e.g., 60, 62). For example, a quantum-based secret key may be generated using a plurality of spectrally correlated, polarization-entangled photon pairs. The number of pairs may be based on the length of the quantum-based secret key. The longer that key, the longer the duration of the distribution may be. Each receiver, in the Receiver Pair, may communicate with the network controller 100 via the network interface(s) 410 to generate the quantum-based secret key.

In an aspect of the disclosure, once the quantum-based secret key, for each receiver (e.g., Receiver 1 20A, Receiver 2 20B) of the Receiver Pair, is generated and confirmed, the processor 400 may cause the WSS controller(s), respectively, to stop the distribution of the spectrally correlated, polarization-entangled photon pair(s) to the Receiver Pair. The processor 400 may issue an instruction to switch path of the channels (either to another Pair of Receivers or to a preset location within the WSS(es)) to the WSS controller (s), respectively, via the controller interface(s) 415. The processor 400 may update the allocation list in the memory 405 for the channels to “available”. The processor 400 may also issue a notification to the Receiver Pair to disconnect from the output ports. This will enable other receivers to connect to these output ports. When the WSS controller(s) detect that the receivers are disconnected from the output ports, the WSS controller(s) transmits an indication to the processor 400 to update the status of the output ports, e.g., to available.

In other aspects of the disclosure, the request may include an indication of the application. Each different application may have a preset distribution time stored in memory 405. When the distribution begins, the processor 400 may set a timer to the preset distribution time for the specified application. Once the timer expires, the processor 400 may cause the WSS controller(s) to stop the distribution of the spectrally correlated, polarization-entangled photon pair(s) to the Receiver Pair and update the allocation list in the memory 405 for the channels to “available”. Once the timer expires, the receivers may issue a renewed request.

In other aspects of the disclosure, one or both of the receivers in the Receiver Pair may transmit an end notification to the processor 400 in the network controller 100 via the network interface(s) 410. In response to receiving the end notification, the processor 400 may cause the WSS controller(s) to stop the distribution of the spectrally correlated, polarization-entangled photon pair(s) to the Receiver Pair and update the allocation list in the memory 405 for the channels to “available”.

In other aspects, distribution is stopped in response to one or both receivers in the Receiver Pair being disconnected from the output port(s). Initially, the disconnection is detected by the WSS controller(s). In response, the WSS controller(s) transmits an indication to the processor 400. When the processor 400 receives this indication, the processor may issue an instruction to the WSS controller(s) to stop the distribution of the spectrally correlated, polarization-entangled photon pair(s) to the Receiver Pair, update the allocation list in the memory 405 for the channels to “available” and update the status of the output port(s).

As used herein terms such as “a”, “an” and “the” are not intended to refer to only a singular entity but include the general class of which a specific example may be used for illustration. As used herein, terms defined in the singular are intended to include those terms defined in the plural and vice versa.

References in the specification to “one aspect”, “certain aspects”, “some aspects” or “an aspect”, indicate that the aspect(s) described may include a particular feature or characteristic, but every aspect may not necessarily include the particular feature, structure, or characteristic. Moreover, such phrases are not necessarily referring to the same aspect.

Aspects of the present disclosure may be implemented and run on a general-purpose computer or special-purpose computer system. The computer system may be any type known or will be known systems and may include a hardware processor, memory device, a storage device, input/output devices, internal buses, and/or a communications interface for communicating with other computer systems in conjunction with communication hardware and software, etc.

Various aspects of the present disclosure may be embodied as a program, software, or computer instructions embodied or stored in a computer or machine-usable or readable medium, or a group of media which causes the computer or machine to perform the steps of the method when executed on the computer, processor, and/or machine. A program storage device readable by a machine, e.g., a computer-readable medium, tangibly embodying a program of instructions executable by the machine to perform various functionalities and methods described in the present disclosure is also provided, e.g., a computer program product.

The computer-readable medium could be a computer-readable storage device or a computer-readable signal medium. A computer-readable storage device may be, for example, a magnetic, optical, electronic, electromagnetic, infrared, or semiconductor system, apparatus, or device, or any suitable combination of the foregoing; however, the computer-readable storage device is not limited to these examples except a computer-readable storage device excludes computer-readable signal medium. Additional examples of the computer-readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer-readable storage device is also not limited to these examples. Any tangible medium that can contain, or store, a program for use by or in connection with an instruction execution system, apparatus, or device could be a computer-readable storage device.

A computer-readable signal medium may include a propagated data signal with computer-readable program code embodied therein, such as, but not limited to, in baseband or as part of a carrier wave. A propagated signal may take any of a plurality of forms, including, but not limited to, electro-magnetic, optical, or any suitable combination thereof. A computer-readable signal medium may be any computer-readable medium (exclusive of computer-readable storage device) that can communicate, propagate, or transport a program for use by or in connection with a system, apparatus, or device. Program code embodied on a computer-readable signal medium may be transmitted using any appropriate medium, including but not limited to wireless, wired, optical fiber cable, RF, etc., or any suitable combination of the foregoing.

The terms "computer system" and "network" as may be used in the present application may include a variety of combinations of fixed and/or portable computer hardware, software, peripherals, mobile, and storage devices. The computer system may include a plurality of individual components that are networked or otherwise linked to perform collaboratively, or may include one or more stand-alone components. The hardware and software components of the computer system of the present application may include and may be included within fixed and portable devices such as mobile phone, tablet, smartphone, desktop, laptop, and/or server. A module may be a component of a device, software, program, or system that implements some "functionality", which can be embodied as software, hardware, firmware, electronic circuitry, or etc.

As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually. For example, multiple processors may allow load balancing. As used herein, the term "processor" may be replaced with the term "circuit". The term "processor" may refer to, be part of, or include processor hardware (shared, dedicated, or group) that executes code and memory hardware (shared, dedicated, or group) that stores code executed by the processor.

In the description and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein. For example, the term about when used for a measurement in mm, may include +/0.1, 0.2, 0.3, etc., where the difference between the stated number may be larger when the state number is larger. For example, about 1.5 may include 1.2-1.8, where about 20, may include 19.0-21.0.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. A system for distributing entangled photon pairs, the system comprising:

a source of entangled photon pairs, the source comprising a pump laser and a nonlinear medium that are configured and operated to produce, when the pump laser pumps the nonlinear medium, pairs of polarization-entangled frequency-correlated photons having frequencies $f_C$ and $f_L$ centered on a boundary between a C-band and a L-band, wherein for any pair of entangled photons, the frequency $f_C$ of one is within a C-band frequency range and the frequency $f_L$ of the other one is within a L-band frequency range, where the frequency of each is equidistant from the boundary;

a wavelength division multiplexer (WDM) optically coupled with the source, the WDM having a first port and a second port, the WDM configured to direct photons of the entangled photon pairs having frequencies in the C-band frequency range to the first port, and photons of the entangled pairs having corresponding frequencies in the L-band frequency range to the second port;

a C-band wavelength-selective switch (WSS) optically coupled with the WDM at the first port, the C-band WSS having $M_C$ distribution ports;

an L-band WSS optically coupled with the WDM at the second port, the L-band WSS having $M_L$ distribution ports, wherein the photons entering the C-band WSS are grouped by frequency into N channels of δf-width bins aligned to the International Telecommunication Union (ITU) grid for control and photons entering the L-band WSS are grouped by frequency into N channels of δf-width bins aligned to the ITU grid for control, where $N \geq M_C$ and $N \geq M_L$, wherein the C-band WSS's $j^{th}$ channel associated with a channel frequency $f_{cj}$ is controllable concurrently with the L-band WSS's $j^{th}$ channel associated with a channel frequency $f_{Lj}$, for channel frequencies that are equidistant from the boundary, where $j=1, \ldots, N$; and a network controller having one or more communication interfaces, the network controller communicatively coupled with the C-band WSS and the L-band WSS and receivers, the network controller configured to receive a request to provide to first and second optical receivers respective photons of entangled-photon pairs, wherein the first optical receiver is coupled through an optical communications network to the C-band WSS's $i_C^{th}$ distribution port and the second optical receiver is coupled through the optical-communications network to the L-band WSS's $i_L^{th}$ distribution port, where $i_C=1, \ldots, M_C$ and $i_L=1, \ldots, M_L$, determine if there is available bandwidth to satisfy the request, and cause the C-band WSS to connect the C-band WSS's $j^{th}$ channel to the C-band WSS's $i_C^{th}$ distribution port and the L-Band WSS to connect the L-band WSS's $j^{th}$ channel to the L-band WSS's $i_L^{th}$ distribution port when there is available bandwidth to cause a distribution of photons of entangled-photon pairs to the first and second optical receivers.

2. The system of claim 1, wherein the pump laser has a frequency of 383 THz.

3. The system of claim 1, wherein the nonlinear medium is a periodically poled lithium niobate (PPLN) waveguide.

4. The system of claim 3, further comprising a temperature controller configured to control a temperature of the PPLN waveguide to produce frequency-correlated photons centered at the boundary and spanning at least a preset bandwidth.

5. The system of claim 3, wherein the PPLN waveguide has a length of about 12 mm.

6. The system of claim 1, wherein the network controller is configured to set the width of each channel bin, wherein the width of each channel bin is selectable from a group consisting of δf=12.5, 25, 50, 100, or 200 GHz.

7. The system of claim 1, wherein the request is for any entangled-photon pairs or for a specific entangled-photon pair requested by corresponding frequencies.

8. The system of claim 7, wherein the network controller is further configured to determine whether channels associated with the specific entangled photon pair requested by corresponding frequencies are available and in response to the channels being available causing the channels to be respectively connected to the C-band WSS's $i_C^{th}$ distribution port and the L-band WSS's $i_L^{th}$ distribution port.

9. The system of claim 1, wherein the network controller is configured to receive additional requests for providing respective photons of entangled-photon pairs to up to a total of min $(M_C, M_L)$ pairs of optical receivers, and cause each of the C-band WSS and the L-band WSS to connect up to the total of $\min(M_C, M_L)$ of its channels, respectively, indexed $\{j_1, j_2, \ldots, j_{min(M_C,M_L)}\}$ to respective min $(M_C, M_L)$ of its distribution ports, to cause distribution of respective photons of entangled-photon pairs to up to the total of $\min(M_C, M_L)$ pairs of optical receivers.

10. The system of claim 1, wherein the network controller is configured to receive a request to increase bandwidth for providing respective photons of entangled photon pairs to the first and second optical receivers, determine whether additional bandwidth is available to satisfy the increase; and cause the C-band WSS's $k^{th}$ channel to be connected to the same C-band WSS's $i_C^{th}$ distribution port and the L-band WSS's $k^{th}$ channel to be connected the same L-band WSS's $i_L^{th}$ distribution port, where $k \neq j$, when it is determined that additional bandwidth is available to satisfy the request to increase bandwidth, to cause increased distribution of respective photons of entangled-photon pairs to the first and second optical receiver.

11. The system of claim 1, wherein each of the C-band WSS and the L-band WSS comprises a controller and a spatial light modulator, wherein the network controller communicates with the controller to cause a channel to be connected to a specific distribution port, wherein in response to a control signal from the network controller, the controller controls the spatial light modulator.

12. The system of claim 11, wherein the spatial light modulator is a liquid crystal on silicon type.

13. The system of claim 1, wherein the network controller transmits a notification to the first optical receiver and the second optical receiver indicates that the C-band WSS's $j^{th}$ channel and the L-band WSS's $j^{th}$ channel have been connected.

14. The system of claim 1, wherein in response to a determination that bandwidth is not available to satisfy the request, the network controller transmits a notification to the first receiver and the second receiver indicating that the request is denied.

15. The system of claim 1, wherein the pump laser has a frequency of 191.5 THz.

16. The system of claim 15, further comprising a notch filter upstream of the WDM configured to remove light at the frequency of the pump laser and wherein the nonlinear medium is configured for second-harmonic generation.

17. A network comprising:

a first optical receiver;

a second optical receiver collocated with the first optical receiver at a single user facility; and the system for distributing entangled-photon pairs as recited in claim 1, wherein the first and second optical receivers are configured to receive, at the single user facility, respective photons of entangled-photon pairs in response to the request.

18. A network comprising:

a first optical receiver located at a first user facility;

a second optical receiver located at a second user facility disposed remotely from the first user facility; and the system for distributing entangled-photon pairs as recited in claim 1, wherein the first and second optical receivers are configured to receive respective photons of entangled-photon pairs in response to the request.

19. The network of claim 18, wherein the first user facility and the second user facility are configured to communicate with each other using a secret key generated by quantum key distribution (QKD) from the received entangled-photon pairs.

20. The network of claim 18, wherein the first user facility and/or the second user facility are configured to perform teleportation using the received entangled-photon pairs.

21. A system for distributing entangled-photon pairs for multi-band spectrum, the system comprising:

a source of entangled-photon pairs, the source comprising a pump laser and a nonlinear medium that are configured and operated to produce, when the pump laser pumps the nonlinear medium, pairs of polarization-entangled frequency-correlated photons having frequencies $f_i$ and $f_{ii}$ centered on a boundary between two bands of the multi-band spectrum, wherein for any pair of entangled photons, the frequency $f_i$ of one is within a band frequency range and the frequency $f_{ii}$ of the other one is within another band frequency range, where the frequency of each is equidistant from the boundary;

beam splitting subsystem in optical communication with the source, the beam splitting subsystem is configured to receive the pairs of polarization-entangled frequency-correlated photons and divide the received polarization-entangled frequency-correlated photons into different optical paths by band;

a first-band wavelength-selective switch (WSS) positioned in a first path of the different optical paths and configured to receive polarization-entangled frequency-correlated photons in a first band, the first-band WSS having $M_{ff}$ distribution ports;

an second-band WSS positioned in a second path of the different optical paths, and configured to receive polarization-entangled frequency-correlated photons in a second band, the second-band WSS having $M_{ss}$ distribution ports, wherein the photons entering the first-band WSS are grouped by frequency into N channels of δf-width bins aligned to the ITU grid for control and photons entering the second-band WSS are grouped by frequency into O channels of δf-width bins aligned to the ITU grid for control, where $N \geq M_{ff}$ and $0 \geq M_{ss}$, wherein the first-band WSS's $j^{th}$ channel associated with a channel frequency $fi_j$ is controllable concurrently with the second-band WSS's $j^{th}$ channel associated with a channel frequency $f_{ii_j}$, for channel frequencies that are equidistant from the boundary, where j=1, . . . , N; and a network controller having one or more communication interfaces, the network controller communicatively coupled with the first-band WSS and the second-band WSS and receivers, the network controller configured to receive a request to provide to first and second optical receivers respective photons of entangled photon pairs, wherein the first optical receiver is coupled through an optical communications network to the first-band WSS's $$a_w^{th}$$

distribution port and the second optical receiver is coupled through the optical communications network to the second-band WSS's $$a_x^{th}$$

distribution port, where $a_w$=1, . . . , $M_{ff}$ and $a_x$=1, . . . , $M_{ss}$, determine if there is available bandwidth to satisfy the request, and cause the first-band WSS to connect the first-band WSS's $j^{th}$ channel to the first-band WSS's $$a_w^{th}$$

distribution port and the second-band WSS to connect the second-band WSS's $j^{th}$ channel to the second-band WSS's $$a_x^{th}$$

distribution port when there is available bandwidth to cause a distribution of photons of entangled-photon pairs to the first and second optical receivers.

22. The system for distributing entangled-photon pairs for multi-band spectrum of claim 21, wherein the beam splitting subsystem comprises one or more dichroic beam splitters.

23. The system for distributing entangled-photon pairs for multi-band spectrum of claim 21, further comprising a third-band WSS positioned in a third path of the different optical paths, the third-band WSS having $M_{tt}$ distribution ports, wherein the photons entering the third-band WSS are grouped by frequency into P channels of δf-width bins aligned to the ITU grid for control, where $P \geq M_{tt}$, wherein the third-band WSS's $k^{th}$ channel associated with a channel frequency $fi_k$ is controllable concurrently with the second-band WSS's $z^{th}$ channel associated with a channel frequency $f_{ii_z}$, for channel frequencies that are equidistant from the boundary, where k=1, . . . , P; and z=N, . . . O, the network controller being further communicatively coupled with the third-band WSS and, the network controller is further configured to receive a request to provide to a third optical receiver and a fourth optical receiver respective photons of entangled photon pairs, wherein the third optical receiver is coupled through the optical communications network to the third-band WSS's $$a_v^{th}$$

distribution port and the fourth optical receiver is coupled through the optical communications network to the second-band WSS's $$a_x^{th}$$

distribution port, where $a_v$=1, . . . , $M_{tt}$ and $a_x$=1, . . . , $M_{ss}$, determine if there is available bandwidth to satisfy the request, and cause the third-band WSS to connect the third-band WSS's $k^{th}$ channel to the third-band WSS's $$a_v^{th}$$

distribution port and the second-band WSS to connect the second-band WSS's $z^{th}$ channel to the second-band WSS's $$a_x^{th}$$

distribution port when there is available bandwidth to cause a distribution of photons of entangled-photon pairs to the third and fourth optical receivers.

24. The system for distributing entangled-photon pairs for multi-band spectrum of claim 23, wherein the first-band WSS is for a C-band, the second-band WSS is for a L-band, and the third-band WSS is for S-band.

25. The system for distributing entangled-photon pairs for multi-band spectrum of claim 21, wherein the network controller comprises a storage configured to store identifiers associated with spectrally correlated frequencies channels from two different WSSes and status information associated with the identifiers, the status information indicating usage, and wherein, in determining whether bandwidth is available, the network controller refers to status information for the spectrally correlated frequencies channels.

26. The system for distributing entangled-photon pairs for multi-band spectrum of claim 21, wherein the pump laser has a frequency centered on the boundary between the two bands of the multi-band spectrum.

* * * * *